United States Patent Office

3,565,660
Patented Feb. 23, 1971

3,565,660
CHEMICAL MASKING COMPOSITION
Thomas F. Sincock, Simsbury, Conn., assignor to Monsanto Company, St. Louis, Mo., a corporation of Delaware
No Drawing. Filed Jan. 3, 1968, Ser. No. 695,359
Int. Cl. B05c 3/20; B29d 27/00
U.S. Cl. 117—5.5                                           5 Claims

ABSTRACT OF THE DISCLOSURE

The present invention relates to a coating composition comprising a resinous ester dissolved in alcohol which is used to mask portions of a polystyrene-containing plastic from a liquid foaming agent which is used to foam unmasked surface portions of the plastic.

---

The present invention relates to chemical masking coatings for plastic articles of manufacture and more particularly to a chemical coating for shielding a plastic article of manufacture during a subsequent foaming operation.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In U.S. Pat. No. 3,262,625 there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc., are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

In a copending application Ser. No. 407,117, filed Oct. 28, 1964, now abandoned, there is described a method of chemically masking portions of a plastic article prior to the steeping action to shield portions of the plastic from the plastic-absorbable medium. The approach is sound but unfortunately many of the broadly described chemical masking compositions are limited with respect to polystyrene containing plastics in terms of barrier properties, adhesion to the plastic and compatibility with the foaming medium employed.

Accordingly, it is a principal object of the present invention to foam predetermined surface areas on plastic articles composed of at least 50 percent polystyrene utilizing a special masking chemical composition.

A further object of the present invention is to provide a coating composition which will serve as a barrier between a plastic and a liquid foaming agent for the plastic.

A further object of this invention is to provide method and means to attain the preceding objects.

Other objects of this invention will in part be obvious and will in part appear hereinafter.

These and other objects are attained by coating an initially designated surface portion of a plastic article containing at least 50 perecnt polystyrene with a fluid substance comprising 5 to 60 parts by weight of a resinous ester having an acid number in excess of 50 and 95 to 40 parts by weight of an alcohol having one to eight carbon atoms, exposing a secondarily designated surface portion of said article which includes at least a portion of said initially designated surface portion to an organic liquid which is at least a partial solvent for the plastic and applying heat to the plastic article to produce a foam covering at the exposed and previously uncoated areas.

Preferentially the resinous ester used is a derivative of rosin or rosin acids, a modified rosin, or modified terpene hydrocarbons. Thus, in one embodiment the resinous esters are the polyhydric alcohol esters of rosin acids. In another embodiment the resinous esters are the alpha,beta-ethylenically unsaturated polycarboxylic acid, or anhydride, adducts of rosin acids or the polyhydric alcohol esters thereof. In still another embodiment the resinous esters are the alpha,beta-ethylenically unsaturated polycarboxylic acids, or anhydrides, adducts of terpene hydrocarbons or the polyhydric alcohol esters thereof.

The rosin or rosin acids used may be any of those ordinarily employed such as gum or wood rosin, pure oleorosin, sapinic acids, pimaric acids, abietic acids etc. In addition, there may be used polymerized, disproportionated, or hydrogenated rosin, or the rosin fractions of tall oil, all of which materials are herein broadly referred to as rosin acids. Terpene hydrocarbons include alpha-pinene, beta-piene, dipentene, d-limonene, 1-limonene, terpinoline, p-cymene, $\Delta^3$-carene, sabinene, camphane, p-menthane, alpha-terpinene, etc.

In greater detail, polyhydric alcohols which may be esterified with the rosin acids or the polycarboxylic acid adducts specified above include, for example, ethylene glycol, propylene glycol, butylene glycol, polyethylene glycols, polypropylene glycols, glycerol, diglycerol, triglycerol, higher polyglycerols, pentaerythritol, di-pentaerythritol, higher pentaerythritols, 2,2,6,6-tetramethylolcylohexanol, 3,3,5,5-tetramethylol-pyran-4-ol, 3,3,5-trimethylol-5-methylpyran-4-ol, erythritol, xylitol, sorbitol, mannitol, sucrose, and the like. The alpha,beta-ethylenically unsaturated polycarboxylic acids which may be adducted with the rosin acids include, for example, maleic acid, fumaric acid, citraconic acid, mesaconic acid, aconitic acid, itaconic acid, and the like. Where available, the anhydrides of these acids may be used in their place.

Most of these resinous esters are commercially available. The polyhydric alcohol esters of rosin acids (naturally available as ester gum) include the glycerol esters and the pentaerythritol esters commercially available under a variety of trade names such as "Amberol," "Pentalyn," "Cellolyn," etc. Methanol and phenol modified esters include resins commercially available under the trade names "Abalyn," "Amberol," etc. Adducts of alpha,beta-ethylenically unsaturated polycarboxylic acid and terpene hydrocarbons include resins commercially available under the trade name "Petrex SS." Adducts of alpha, beta-ethylenically unsaturated polycarboxylic acids and rosin acids include maleic modified rosin acids and maleic modified rosin acid/glycerol esters commercially available under a variety of trade names such as "Lewisol," "Amberol," "Amberol 750," "Amberlac," Cellolyn," etc.

The following examples are given to illustrate the invention and are not intended as limitations thereof. Unless otherwise specified, quantities are mentioned on a weight basis.

EXAMPLE I

A chemical masking composition is made up by adding 60 parts of Methanol to 14.8 parts of "Pentalyn 255" (a resinous ester formed by esterifying rosin acids comprised largely of abietic acid with pentaerythritol and characterized by an acid number of 190–220 and a softening point of 169–181° C.). The mixture is stirred until a homogeneous solution is obtained.

Styrene homopolymer having a Staudinger molecular weight of approximately 55,000 is molded in the form of a smooth, tapered cup which is approximately four inches in height with an average inside cup diameter of two and one quarter inches.

The cup formed by the above-described operation is steeped by immersing one-half inch of the lower or bottom portion of the cup in the above-described chemical masking composition. After a 3 second interval the cup is withdrawn from the coating substance and allowed to dry for 45 seconds. The cup is then steeped for 5 seconds in Freon (trichlorofluoromethane) up to within one-half inch of its top peripheral edge. After the cup is withdrawn from the solvent, it is exposed to dry room temperature conditions for 20 seconds and then heated by 110° C. air for a period of 10 seconds.

The resulting cup has a foamed outer surface throughout the area of solvent immersion except at the area coated with the chemical masking composition extending into the body of the cup approximately a third of its overall thickness. Further examination of the cup discloses that the overall structural properties of the cup are not seriously altered by the above-described process while at the same time the insulating properties of the cup are increased several fold.

EXAMPLE II

Example I is repeated substituting 30 parts by weight of "Petrex SS" (a resinous ester formed by reacting maleic anhydride with rosin acid or terpene hydrocarbons) for the 14.8 parts by weight of "Pentalyn 255" and ethanol for the methanol employed therein. Substantially equivalent results are obtained.

EXAMPLE III

Example I is repeated substituting 35 parts by weight of "Amberol" (a resinous ester formed by esterifying the reaction product of maleic anhydride and rosin acid with glycerol) for the 14.8 parts by weight of "Pentalyn 255" employed therein. Substantially equivalent results are obtained.

It is important in the present invention that the acid number of the resinous ester be in excess of 50 particularly to provide the solubility of the ester in alcohol which is necessary in the present invention. Although tthe acid number can be substantially higher than 50, it is generally preferable not to exceed 600. Furthermore, the gram molecular weight of the resinous ester will generally vary between 200 to 2000. The alchol used to dissolve the resinous acid may be of any of the various types which are liquid at room temperature. In general, however, monatomic aliphatic alcohols having one to eight carbon atoms have been found to be the most suitable.

Any suitable equipment may be employed which will serve the purpose of initially coating the plastic article and subsequently exposing the plastic article to a plastic solvent or at least partially solvating liquid for the plastic. For example, the initial coating may be applied by dipping or using a brush, roll or similar device.

The quantity of the coating applied may be such that the dry coating weight is from about 0.5 to 10 milligrams/sq. in. and more preferably 1 to 3 milligrams/sq. in.

In general, the plastics treated in the practice of this invention are plastic materials containing at least 50 percent by weight of polystyrene which have been fabricated into various shapes. Particularly useful materials for forming articles such as containers are polystyrene homopolymers and rubber modified polystyrene or polystyrene which preferably has incorporated therein a rubber compound grafted on to the molecule.

With respect to the coating operation, dipping or partial immersion of the plastic article is preferred. An immersion of only a few seconds is generally all that is necessary to produce an adequately coated form. In addition, the period of time between the coating operation and the subsequent exposure to the plastic solvent or partial solvent is considered critical, particularly where the coating substance does not dry readily. Consequently, some experimentation is generally necessary to determine the optimum drying time for the coating substance with regard to the particular plastic solvent used.

The plastic solvent can be any material which is at least a partial solvent for the plastic being processed and (2) convertible to a gaseous state at a temperature below the melting point temperature of the polystyrene-containing plastic. Freon (trichlorofluoromethane) is generally preferred for polystyrene homopolymers and rubber modified interpolymers with methylene chloride, acetone, dichloroethylene, xylene, carbon tetrachloride, methyl ethyl ketone, benzol, toluol, chloroform and the like being somewhat less suitable but effective.

The steeping operation or exposure of the plastic to the plastic solvent or partial solvent generally requires only a few seconds depending for the most part on the depth of foam desired, and the respective temperatures of the solvent and plastic article. The steeping operation may be effected by any suitable method such as immersion of the plastic article in a liquid medium or even by subjecting the plastic article to vapors in a vessel which may or may not be pressurized.

In general, the plastic article is perimtted to dry for short intervals of time prior to the heating or foaming operation. This dyring interval allows deeper diffusion and serves to harden the outer surface of the plastic forming a skin which aids considerably in the formation of closed cell structures which are considered important for good insulating properties. If desired, the drying interval may be accelerated by forced air blasts, moderate heating conditions, etc.

After the drying interval, the plastic article is heated in accordance with the practice of this invention to foam portions of the plastic article at designated areas. The heating means utilized may vary, the final results being affected by the uniformity of heating, rate of heating and temperature level at which it is conducted. The temperature level will, of course, be above the temperature at which the plastic solvent converts from a liquid state to a gaseous state. Any of the three fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastic, it is sometimes desirable to support or fix the sheet dimensionally during the heating operation to avoid loss of orientation.

The structures which may be fabricated in the practice of this invention are exceptionally useful for applications requiring high insulating characteristics at defined areas and good structural properties such as cups vended from stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled which the present coating composition will accomplish.

It is obvious that many variations may be made in the products and processes set forth above without departing from the spirit and scope of this invention.

What is claimed is:

1. The process for selectively foaming predetermined surface areas on a plastic article containing at least 50 percent by weight of polystyrene which comprises coating an initially designated surface portion of a plastic article containing at least 50 percent by weight of polystyrene with a solution comprising 5 to 60 parts by weight of a resinous ester having an acid number in excess of 50 and 95 to 40 parts by weight of an alcohol having one to eight carbon atoms, drying said coated, initially designated surface portion to substantially remove the alcohol therefrom, exposing a secondarily designated surface portion of said article which includes at least a portion of said initially designated surface portion to a foaming agent which is at least a partial solvent for the plastic and which is convertible to a gaseous state at a temperature below the melting point temperature of the article and applying heat to the plasic article to produce a foam covering at the exposed and previously uncoated areas.

2. The process according to claim 1 wherein the resinous ester is selected from the class consisting of the polyhydric alcohol esters of rosin acids, the alpha,beta-ethylenically unsaturated polycarboxylic acid adducts of rosin acids and the polyhydric alcohol esters thereof, and the alpha,beta-ethylenically unsaturated polycarboxylic acid adducts of terpene hydrocarbons and the polyhydric alcohol esters thereof.

3. The process according to claim 1 wherein the plastic article is composed of a rubber modified polystyrene containing at least 50 percent by weight of polystyrene.

4. The process according to claim 1 wherein the coating is accomplished by partially immersing the plastic article in the solution.

5. The process according to claim 1 wherein the organic liquid is trichlorofluoromethane.

References Cited
UNITED STATES PATENTS

| | | | |
|---|---|---|---|
| 3,428,471 | 2/1969 | Tuthill et al. | 117—10 |
| 3,389,199 | 6/1968 | Bushnell, Jr. et al. | 117—8.5 |
| 3,300,553 | 1/1967 | Shelby | 264—53 |

ALFRED L. LEAVITT, Primary Examiner

M. F. ESPOSITO, Assistant Examiner

U.S. Cl. X.R.

117—8.5, 38; 161—160; 264—45, 52, 53